US012594918B2

(12) United States Patent　　(10) Patent No.:　US 12,594,918 B2
Chaumette et al.　　(45) Date of Patent:　　Apr. 7, 2026

(54) BRAKE-BY-WIRE MODULE INCLUDING PRESSURE BALANCED PSU PISTON WITH WETTED BALL SCREW AND BACKUP PUMP ASSEMBLY

(71) Applicant: BWI (Shanghai) Co., Ltd., Shanghai (CN)

(72) Inventors: Pascal Chaumette, Creteil (FR); Xiaoxu Zhao, Shanghai (CN); David Fredrick Reuter, Beavercreek, OH (US); Dongqiang Luo, Shanghai (CN); Daniel Norbert Borgemenke, Springboro, OH (US)

(73) Assignee: BWI (Shanghai) Co., Ltd., Shanghai (CN)

( * ) Notice: Subject to any disclaimer, the term of this patent is extended or adjusted under 35 U.S.C. 154(b) by 579 days.

(21) Appl. No.: 18/076,390

(22) Filed: Dec. 6, 2022

(65) Prior Publication Data

US 2023/0174035 A1　　Jun. 8, 2023

Related U.S. Application Data

(60) Provisional application No. 63/287,047, filed on Dec. 7, 2021.

(30) Foreign Application Priority Data

Nov. 8, 2022　(CN) .......................... 202211391501.8

(51) Int. Cl.
B60T 13/74　　(2006.01)
B60T 13/14　　(2006.01)
(Continued)

(52) U.S. Cl.
CPC .......... B60T 13/145 (2013.01); B60T 13/148 (2013.01); B60T 13/686 (2013.01); B60T 15/028 (2013.01);
(Continued)

(58) Field of Classification Search
CPC ........ B60T 8/368; B60T 8/409; B60T 13/745; B60T 13/168; B60T 2270/404; B60T 2270/413; F16H 57/0497
See application file for complete search history.

(56) References Cited

U.S. PATENT DOCUMENTS

| 4,195,538 | A | * | 4/1980 | Brown | ............... | B23Q 11/0825 |
| | | | | | | 285/302 |
| 7,967,395 | B2 | * | 6/2011 | Sakai | ..................... | B60T 8/368 |
| | | | | | | 303/DIG. 10 |

(Continued)

FOREIGN PATENT DOCUMENTS

| CN | 106167012 | A | 11/2016 |
| CN | 115298072 | A | 11/2022 |

(Continued)

OTHER PUBLICATIONS

Extended European Search Report issued on May 4, 2023 for counterpart European patent application No. 22211641.0.

(Continued)

*Primary Examiner* — Bradley T King
(74) *Attorney, Agent, or Firm* — William H. Honaker; Dickinson Wright PLLC

(57)　　　ABSTRACT

An electro-hydraulic brake system includes a master cylinder (MC) configured to supply fluid into a first MC fluid passageway in response to pressing force on a brake pedal; a pressure supply unit (PSU) assembly having a PSU motor coupled to a ball screw actuator, a PSU housing defining a piston bore having a terminal end opposite the PSU motor, and a PSU piston dividing the piston bore into a first chamber and a second chamber and movable by the ball screw actuator, with each of the first chamber and the second chamber containing a hydraulic fluid; and a backup pump assembly including a pump for supplying the brake fluid to at least one of the wheel brakes. The ball screw actuator (Continued)

includes an actuator nut assembly having a plurality of ball bearings each disposed within the piston bore and submerged in the hydraulic fluid.

19 Claims, 9 Drawing Sheets

(51) Int. Cl.

| | |
|---|---|
| *B60T 13/68* | (2006.01) |
| *B60T 15/02* | (2006.01) |
| *B60T 17/02* | (2006.01) |
| *B60T 7/04* | (2006.01) |
| *F16H 57/04* | (2010.01) |

(52) U.S. Cl.
CPC ................ *B60T 17/02* (2013.01); *B60T 7/04* (2013.01); *B60T 13/745* (2013.01); *B60T 2220/04* (2013.01); *B60T 2220/06* (2013.01); *B60T 2270/404* (2013.01); *F16H 57/0497* (2013.01)

(56) References Cited

U.S. PATENT DOCUMENTS

| | | | | |
|---|---|---|---|---|
| 12,194,968 | B2* | 1/2025 | Kim ..................... | B60T 8/4009 |
| 2002/0008426 | A1* | 1/2002 | Isono ................... | B60T 8/4275 |
| | | | | 303/113.5 |
| 2008/0036295 | A1* | 2/2008 | Sakai ..................... | B60T 13/18 |
| | | | | 303/113.1 |
| 2010/0032597 | A1* | 2/2010 | Beer ..................... | B60T 8/4031 |
| | | | | 251/129.01 |
| 2017/0072920 | A1* | 3/2017 | Besier .................. | B60T 8/4081 |
| 2018/0162338 | A1* | 6/2018 | Irwan .................... | B60T 8/171 |
| 2018/0170334 | A1* | 6/2018 | Loeffler ................ | B60T 8/404 |
| 2019/0248348 | A1 | 8/2019 | Ganzel et al. | |
| 2019/0344769 | A1* | 11/2019 | Zimmermann ......... | B60T 8/326 |
| 2019/0351886 | A1* | 11/2019 | Besier .................. | B60T 7/042 |
| 2020/0031327 | A1* | 1/2020 | Mayr .................... | F16K 27/003 |
| 2020/0047731 | A1 | 2/2020 | Reuter | |
| 2020/0114894 | A1* | 4/2020 | Leiber ................... | B60T 8/368 |
| 2020/0139949 | A1* | 5/2020 | Dolmaya .............. | B60T 8/4081 |
| 2020/0369246 | A1* | 11/2020 | Brand ................... | B60T 13/20 |
| 2021/0155215 | A1 | 5/2021 | Ganzel | |
| 2021/0237706 | A1* | 8/2021 | Kim ..................... | B60T 13/745 |
| 2021/0261109 | A1 | 8/2021 | Ganzel | |
| 2021/0347370 | A1* | 11/2021 | Nemeth ................. | B60T 8/885 |
| 2022/0089168 | A1* | 3/2022 | Hoos ..................... | B60L 3/0076 |
| 2022/0194339 | A1* | 6/2022 | Tarandek .............. | B60T 13/745 |
| 2022/0242379 | A1* | 8/2022 | Kim ..................... | B60T 7/042 |
| 2022/0289162 | A1* | 9/2022 | Lee ...................... | B60T 13/686 |
| 2022/0371562 | A1* | 11/2022 | Borgemenke ......... | B60T 13/146 |
| 2023/0012180 | A1* | 1/2023 | Ahn ...................... | B60T 13/686 |
| 2023/0100969 | A1* | 3/2023 | Yogo .................... | B60T 8/4081 |
| | | | | 303/10 |
| 2023/0119335 | A1* | 4/2023 | Zhao .................... | B60T 13/686 |
| | | | | 303/3 |
| 2024/0001899 | A1* | 1/2024 | Stanojkovski ........ | B60T 13/686 |
| 2024/0034291 | A1* | 2/2024 | Weh ...................... | B60T 7/042 |
| 2024/0067144 | A1* | 2/2024 | Ganzel ................. | B60T 13/686 |
| 2024/0132039 | A1* | 4/2024 | Yang .................... | B60T 8/4081 |
| 2024/0149854 | A1* | 5/2024 | Uhlig ................... | F16H 57/0497 |
| 2024/0157925 | A1* | 5/2024 | Weh ...................... | B60T 17/00 |
| 2024/0239318 | A1* | 7/2024 | Weh ...................... | B60T 13/745 |
| 2024/0270223 | A1* | 8/2024 | Auguste ............... | F16D 55/226 |
| 2024/0375629 | A1* | 11/2024 | Sakakibara ........... | B60T 13/74 |
| 2024/0376969 | A1* | 11/2024 | Segawa ............... | F16H 25/2214 |
| 2024/0416885 | A1* | 12/2024 | Otake ................... | B60T 13/662 |
| 2024/0416886 | A1* | 12/2024 | Otake ................... | B60T 13/20 |

FOREIGN PATENT DOCUMENTS

| | | | | |
|---|---|---|---|---|
| DE | 102019107320 | A1 | 9/2020 | |
| JP | 2000185645 | A | 7/2000 | |
| JP | 2021146902 | A | 9/2021 | |
| KR | 20200109172 | A | 9/2020 | |
| KR | 20210109781 | A | 9/2021 | |
| WO | 8903783 | A1 | 5/1989 | |
| WO | WO-8903783 | A * | 5/1989 | ........... B60T 13/745 |

OTHER PUBLICATIONS

First Office Action issued on Jun. 29, 2024 for counterpart Korean patent application No. 10-2022-0169537, along with the English translation.

First Office Action issued for corresponding Japanese Patent Application 2022-195213 issued on Jan. 9, 2024.

The First Office Action issued on May 14, 2025 for counterpart European patent application No. 22211641.0.

The First Office Action and search report issued on Jun. 12, 2025 for counterpart Chinese patent application No. 202211391501.8, along with machine EN translation downloaded from EPO.

The Second Office Action issued on Sep. 25, 2025 for counterpart European patent application No. 22211641.0 (9 Pages).

\* cited by examiner

BRAKE-BY-WIRE MODULE INCLUDING PRESSURE BALANCED PSU PISTON WITH WETTED BALL SCREW AND BACKUP PUMP ASSEMBLY

CROSS REFERENCE TO RELATED APPLICATIONS

This U.S. utility patent application claims the benefit of U.S. Provisional Patent Application No. 63/287,047, filed Dec. 7, 2021, and Chinese Patent Application No. 202211391501.8 filed Nov. 8, 2022, the contents of which are incorporated herein by reference in their entirety.

BACKGROUND OF THE INVENTION

1. Field of the Invention

The present disclosure relates generally to brake systems for vehicles, such as automobiles. More specifically, the present disclosure relates to a brake-by-wire system with a pressure supply unit (PSU) having a pressure-balanced piston.

2. Related Art

As electric and hybrid vehicles continue to proliferate in markets around the world, it is well understood that significant lengthening of battery life can be obtained by utilizing the motor-generator output capabilities of that device during braking. However, the input torque in the generator mode used to recharge batteries is not consistent with driver input function of pedal force/travel verses vehicle deceleration. In order to achieve that complex function, the hydraulic brakes of the vehicle must supply the difference between generator braking torque and driver requested braking torque.

The engineering world has understood this requirement for a number of years commonly known as regenerative brake blending. A most efficient way to achieve this is to use a "brake-by-wire" technique. To accomplish this, the brake pedal in effect becomes a joystick, so it must be connected to a travel and/or force sensor in order to send a signal to the system ECU that will interpret this as driver's intent of a desired vehicle deceleration. In addition, the brake pedal "feel" must be simulated by the appropriate force-travel relationship and must also have the ability to be isolated from directly applying the master cylinder to the wheel brakes.

Brake-by-wire systems typically include a pressure supply unit (PSU) to provide a supply of pressurized fluid for actuating the wheel brakes.

In designing for systems for SAE Autonomy Level 3 or higher, one of the key factors involved is that of redundancy. As the influence of the driver diminishes, the ability of the brake system to have a fallback mode that allow full or nearly full performance is required. This typically has meant a "two-box" approach to the solution. Two basic approaches are known in the industry: One approach is shown in US 2020/0047731 A1, which describes a system comprised of an electro-hydraulic booster with an add-on stability control system. The other approach is a "one-box" arrangement which adds on a separate pump and motor assembly with the necessary ABS valves and other control valves to complete the system.

SUMMARY OF THE INVENTION

The present disclosure provides an electro-hydraulic brake system for actuating wheel brakes of a vehicle. The electro-hydraulic brake system comprises a master cylinder (MC) fluidly coupled to a first MC fluid passageway and configured to supply fluid into the first MC fluid passageway in response to pressing force on a brake pedal coupled thereto. A first MC fluid passageway is directly coupled to a pedal feel emulator (PFE) including a PFE piston movable through a PFE bore and separating an upper chamber from a lower chamber for providing pressure opposing a pressing force on the brake pedal. The electro-hydraulic brake system also comprises a pressure supply unit (PSU) assembly that includes a PSU motor coupled to a ball screw actuator, a PSU housing defining a piston bore having a terminal end opposite the PSU motor, and a PSU piston disposed within the piston bore and movable by the ball screw actuator through the piston bore and dividing the piston bore into a first chamber and a second chamber, with each of the first chamber and the second chamber containing a hydraulic fluid. The electro-hydraulic brake system also comprises a backup pump assembly including a backup pump motor operably coupled to a pump to convey brake fluid for supplying the brake fluid to at least one of the wheel brakes. The ball screw actuator includes an actuator nut assembly having a plurality of ball bearings each disposed within the piston bore and submerged in the hydraulic fluid.

The present disclosure also provides an electro-hydraulic brake assembly. The electro-hydraulic brake system comprises a hydraulic control unit (HCU) body defining a pressure supply bore, a master cylinder bore, and a backup pump bore; and a primary piston slidably disposed in the master cylinder bore and configured to supply brake fluid to a wheel brake in response to pressing of a brake pedal. The electro-hydraulic brake system also comprises a pressure supply unit including a pressure supply piston disposed within the pressure supply bore, and a PSU motor having a motor shaft configured to cause the pressure supply piston to translate linearly through the pressure supply bore. The electro-hydraulic brake system also comprises a backup pump assembly including a backup pump motor and backup pump element disposed in the backup pump bore, the backup pump motor being operably coupled to the backup pump element to convey brake fluid for supplying the brake fluid to the wheel brake.

BRIEF DESCRIPTION OF THE DRAWINGS

Further details, features and advantages of designs of the invention result from the following description of embodiment examples in reference to the associated drawings.

DESCRIPTION OF THE ENABLING EMBODIMENTS

Figure 1:
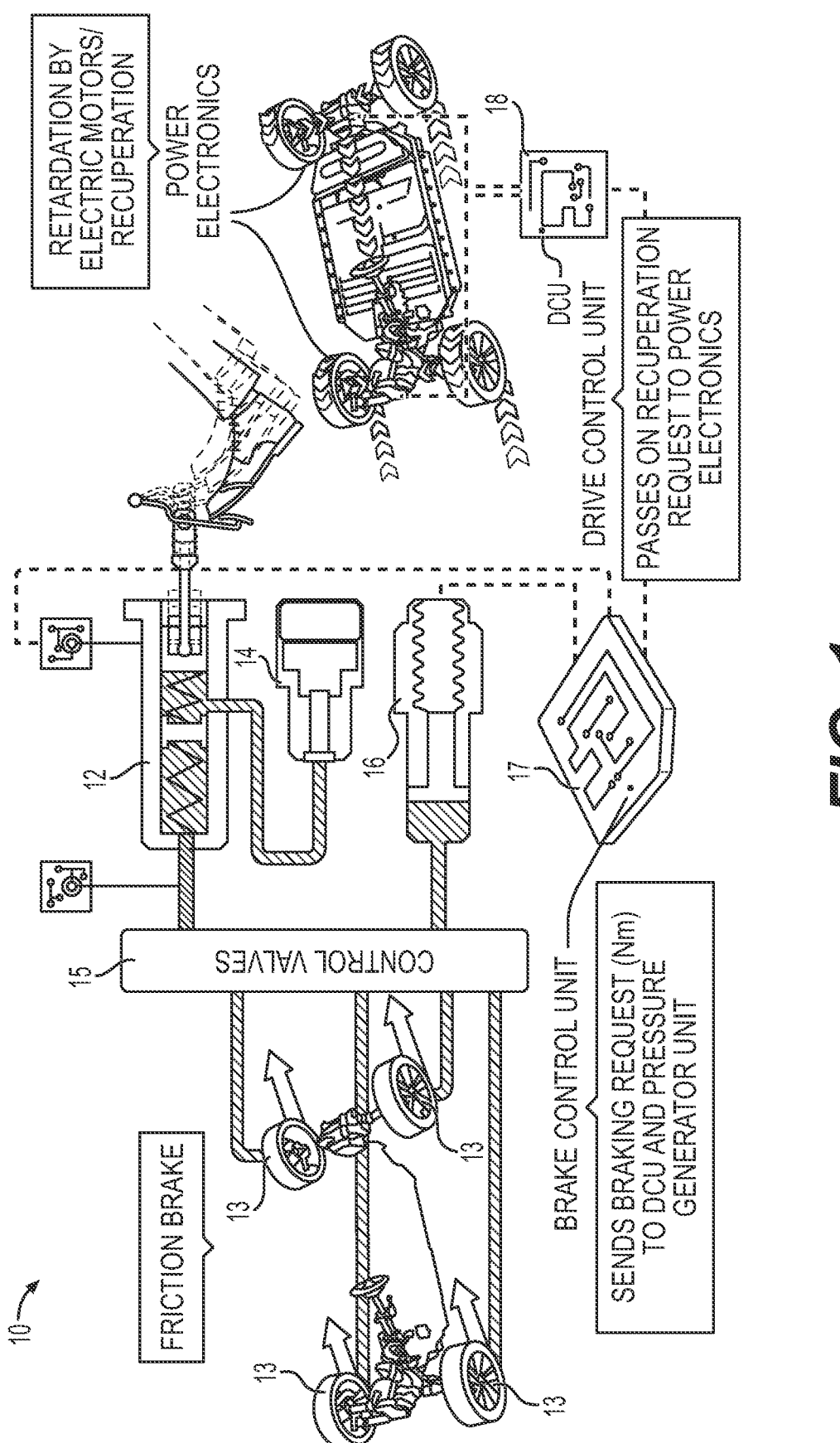
FIG. 1 shows a schematic block diagram of a brake-by-wire (BbW) system in a vehicle.

Referring to the drawings, the present invention will be described in detail in view of following embodiments.

The one-box brake-by-wire system with pressure balanced PSU and wetted ball screw of the present disclosure combines the pump and motor into a single block. The one-box brake-by-wire system with pressure balanced PSU and wetted ball screw of the present disclosure may be suitable for Level 3 or greater automation based on the "Levels of Driving Automation" standard by SAE International that defines six levels of driving automation, as specified in SAE standard J3016. In addition, to avoid the redundancy of a separate Electronic Control Unit (ECU) the system of the present disclosure may include two isolated circuit boards to meet fallback mode safety requirements. This one-box approach may provide lower overall cost and reduced installation time in the vehicle.

FIG. 1 shows a schematic block diagram of a brake-by-wire (BbW) system 10 in a vehicle, such as an automobile. Basic brake-by-wire (BBW) architecture is now well-established in the automotive industry. The vehicle's master cylinder 12 either applies the brakes directly in a failed system fallback mode or is isolated from the wheel brakes 13 and connected to a pedal feel emulator 14 that replicates force, travel, and damping of a traditional brake system. The brake pedal travel and/or force, and/or brake pressure is used by the BbW system 10 as an input signal to a brake electronic control unit (ECU) 17, which in turn sends the appropriate signal to a pressure supply unit (PSU) 16 to apply a corresponding hydraulic braking pressure. The PSU 16 may include a high efficiency brushless motor and ballscrew assembly displacing one or two pistons, which can be thought of as an electric master cylinder. The master cylinder 12 and/or the PSU 16 may be coupled to the wheel brakes 13 via a series of control valves 15, which may include an apply valve and a release valve (not shown) for each of the wheel brakes 13 to provide functions such as antilock braking (ABS), electronic traction control, etc.

The brake pedal inputs define driver intent which determines how fast and how hard the brakes are applied with the goal to replicate the feel of a conventional vacuum booster brake system and achieve the appropriate vehicle deceleration. The brake ECU 17 may also send a signal to a drive control unit (DCU) 18, which may also be called a powertrain control module (PCM), to slow the vehicle using one or more electric motors in a regenerative mode.

Figure 2:
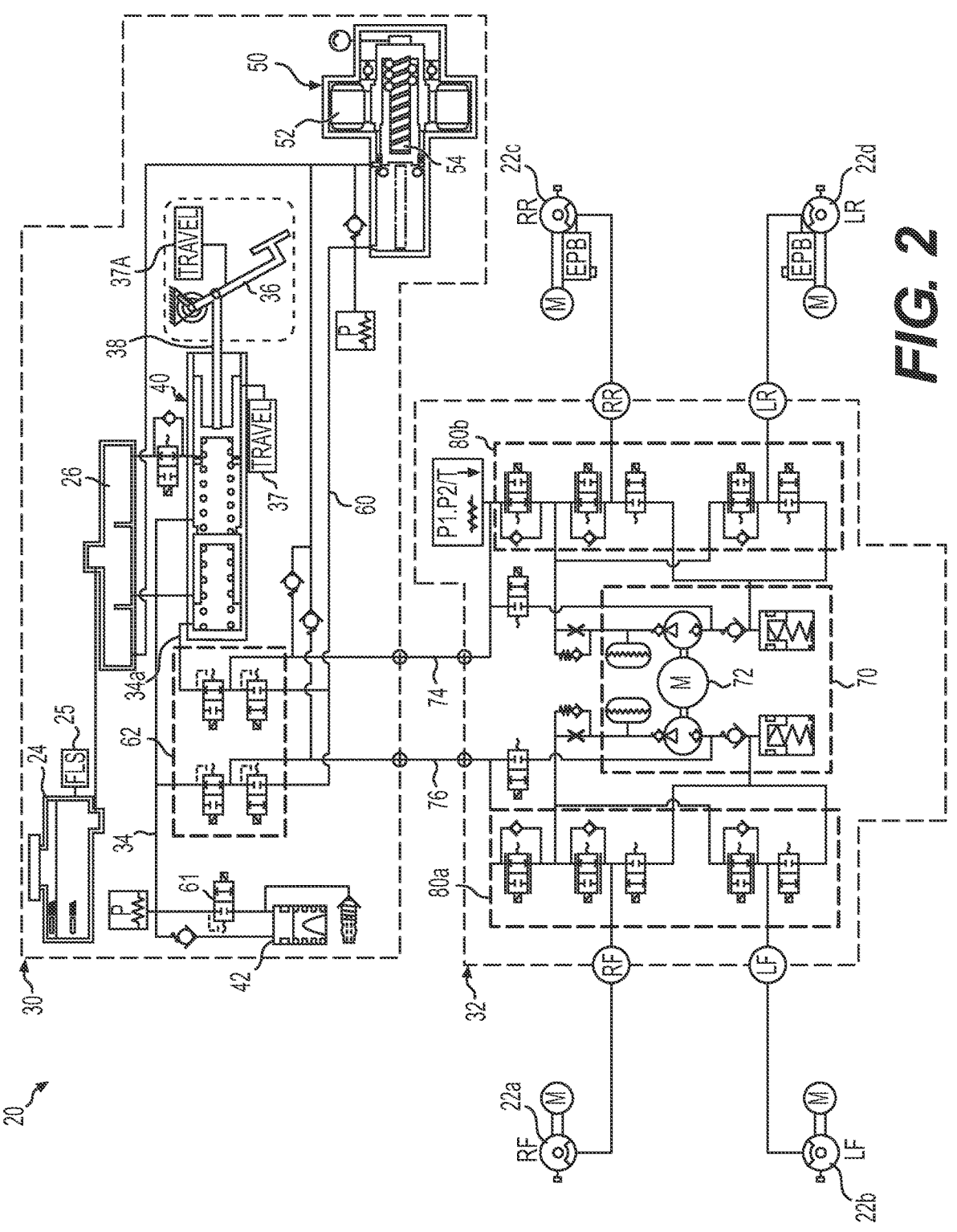
FIG. 2 shows a schematic diagram of a two-box BbW system of the present disclosure.

FIG. 2 shows a schematic diagram of a two-box BbW system 20, in an all-electric vehicle, for controlling braking operation of the wheel brakes 22a, 22b, 22c, 22d. The wheel brakes 22a, 22b, 22c, 22d may be braked either by friction braking from the hydraulically applied calipers and brake linings, or they may be braked by regenerative braking torque produced by motors M coupled to the wheels. The two-box BbW system 20 includes a booster unit 30 and a stability control unit 32. There is a total of 18 solenoid control valves in the two-box BbW system 120. For redundancy in case of PSU failure, the stability control unit 32 can provide boosted output to the wheel brakes 22a, 22b, 22c, 22d by energizing the prime and isolation valves and the backup pump motor 72.

The two-box BbW system 20 includes a fluid reservoir 24 holding a hydraulic fluid and supplying the hydraulic fluid to a master cylinder 40. A fluid level sensor 25, such as a float switch, monitors a level of the hydraulic fluid in the fluid reservoir 24. A local reservoir tank 26 is physically attached to the master cylinder 40 and remote from the fluid reservoir 24. Optionally, a single fluid reservoir 24 may be directly attached to the master cylinder 40, pending space availability in the vehicle. A brake pedal 36 is coupled to press a brake linkage 38 which, in turn, actuates the master cylinder (MC) 40 to pressurize a master cylinder's (MC) fluid passageways 34 and 34a. Travel sensors 37 and 37A each monitor a position of the brake pedal 36.

A pedal feel emulator (PFE) 42 is fluidly coupled to the MC fluid passageway 34 to selectively provide pressure opposing a pressing force on the brake pedal 36, thereby causing a natural feeling of brake operation, particularly when the master cylinder 40 is decoupled from operating the wheel brakes 22a, 22b, 22c, 22d. The PFE 42 includes a PFE piston dividing the PFE 42 into an upper chamber and a lower chamber, and a spring biasing the PFE piston into the upper chamber. The upper chamber of the PFE 42 is fluidly coupled to the MC fluid passageway 34. The lower chamber of the PFE 42 may be vented to atmosphere.

A pressure supply unit (PSU) assembly 50 includes a PSU motor 52 and a PSU pump 54 to supply the hydraulic fluid from the fluid reservoir 24 to a PSU fluid passageway 60. A PFE isolation valve 61, which may be a normally-closed solenoid valve selectively controls fluid flow between the MC fluid passageway 34 and the PFE 42. A valve set 62, which includes four solenoid valves, controls fluid communication between the master cylinder 40 and a brake circuit and between the PSU assembly 50 and a brake circuit. Thus, the valve set 62 may control an operating mode by selectively controlling a source of fluid from either the master cylinder 40 or the PSU assembly 50.

A first conduit 74 and a second conduit 76 provide fluid communication between the booster unit 30 and the stability control unit 32 and corresponding to each of two brake circuits.

FIG. 2 also shows details of the stability control unit 32, including a set of first ABS valves 80a and a set of second ABS valves 82b, each controlling fluid flow to corresponding ones of the wheel brakes 22a, 22b, 22c, 22d. The stability control unit 32 also includes a backup pump assembly 70 including a backup pump motor 72 for actuating one or more of the wheel brakes 22a, 22b, 22c, 22d.

Figure 3:
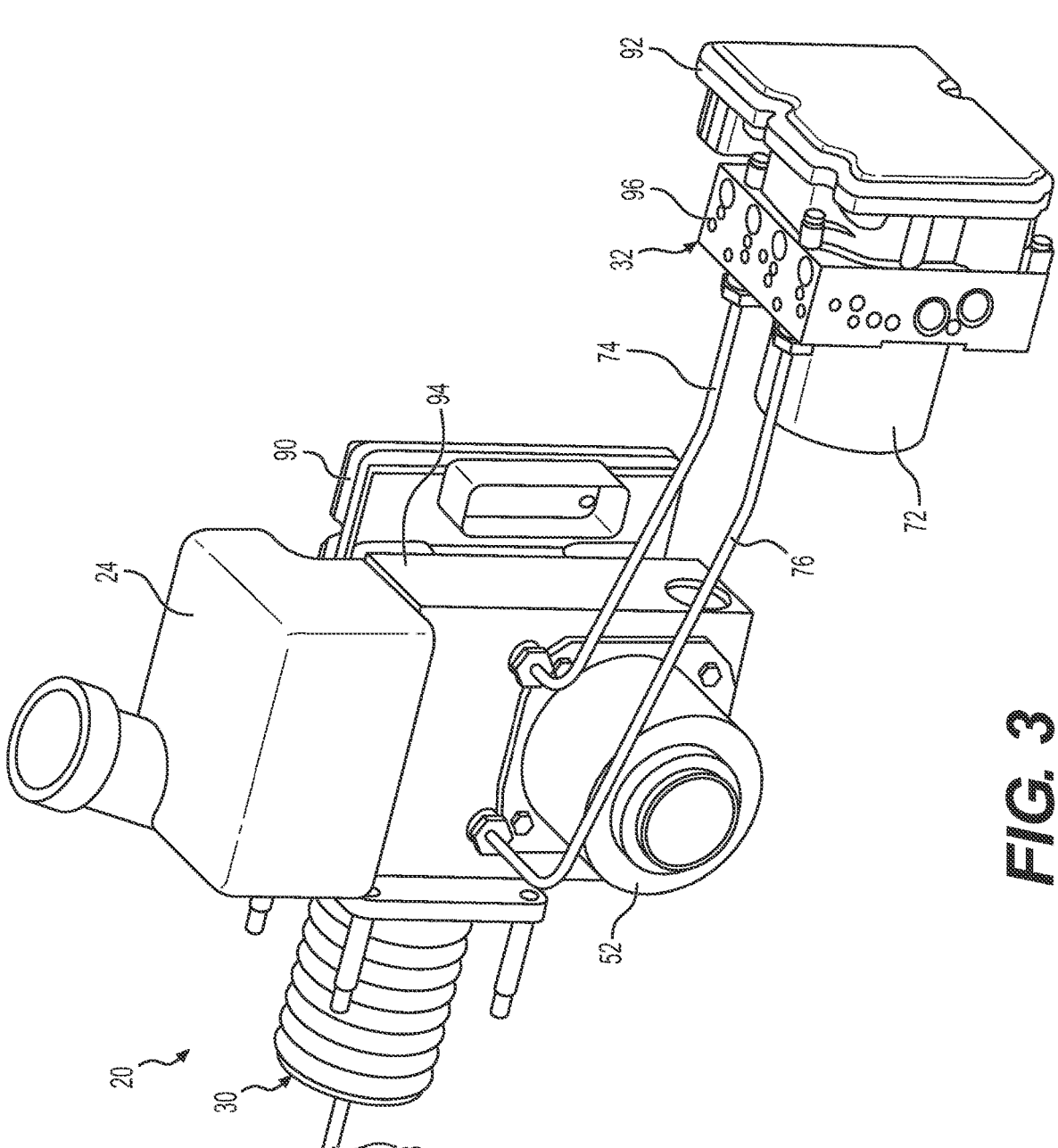
FIG. 3 shows a perspective view of the two-box BbW system of FIG. 2.

FIG. 3 shows a perspective view of the two-box BbW system 20 of FIG. 2. FIG. 3 shows the booster unit 30 connected to the stability control unit 32 by the conduits 74, 76. FIG. 3 shows the booster unit 30 including a booster block 94, which may include a block of material, such as metal, containing the various fluid passages and valves. A booster ECU 90 is attached to a side face of the booster block 94 for controlling the various valves and the PSU motor 52. FIG. 3 also shows the PSU motor 52 attached to a side face of the booster block 94 opposite from the attachment face of the booster ECU 90 and perpendicular to the axis of the master cylinder 40.

FIG. 3 also shows the stability control unit 32 including a stability control block 96, which may include a block of material, such as metal, containing the various fluid passages and valves. The stability control unit 32 also includes a stability control ECU 92 attached to a side face of the stability control block 96 for controlling the various valves and the backup pump motor 72. FIG. 3 also shows the backup pump motor 72 attached to a side face of the stability control block 96 opposite from the stability control ECU 92. The configuration of the second valve set 62b may be shown in U.S. Pat. No. 6,533,369 and/or in US 2020/0047731. The second two-box BbW system 120 includes 17 actuated valves.

Figure 4:
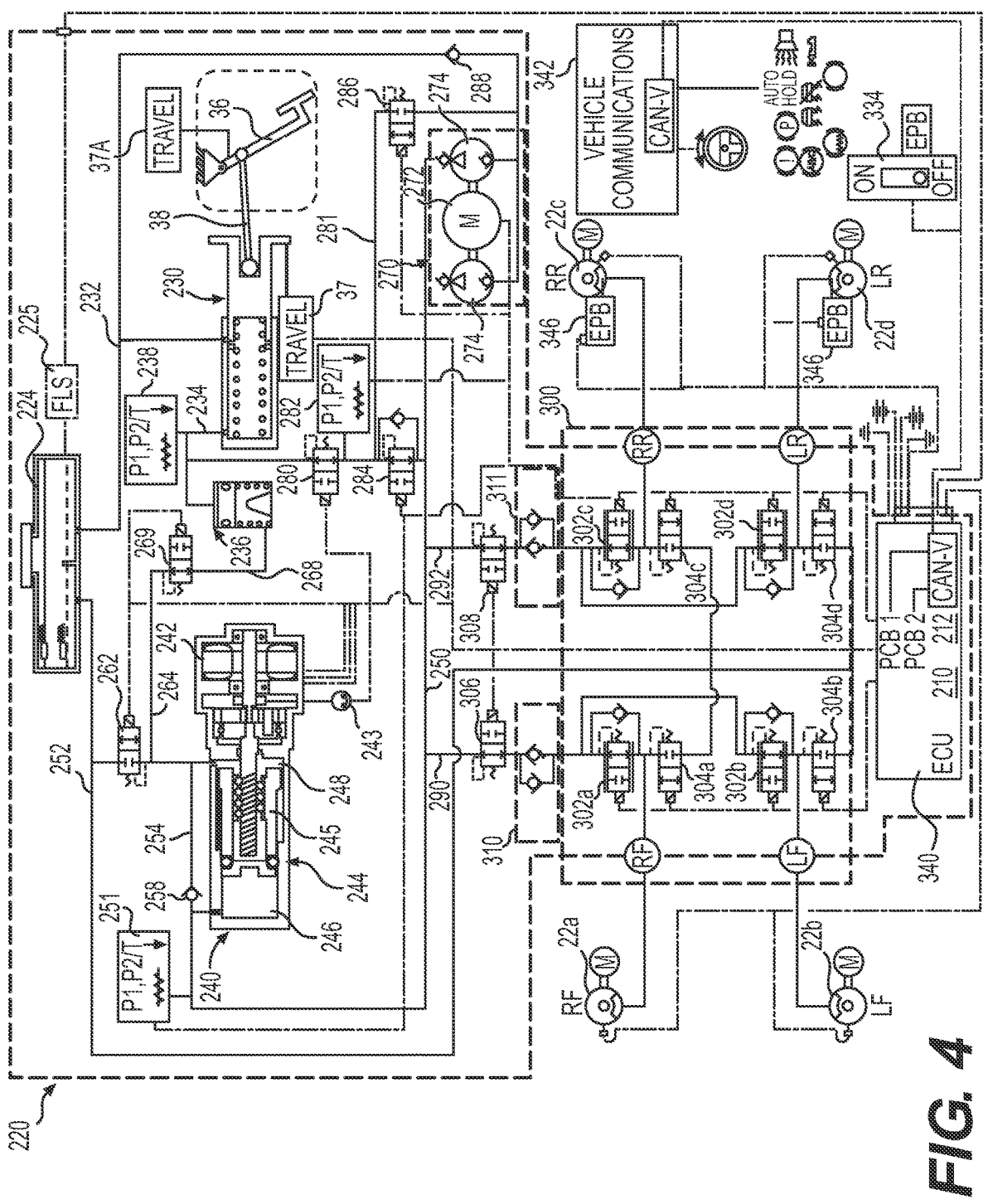
FIG. 4 shows a schematic diagram of a one-box BbW system of the present disclosure.

FIG. 4 shows a schematic diagram, showing details of the one-box BbW system 220. The one-box BbW system 220 is configured as a single unitary module and includes a fluid reservoir 224 holding a hydraulic fluid and supplying the hydraulic fluid to a master cylinder 230 via an intake fluid passage 232. The master cylinder 230 is a single-circuit device having one piston that is displaced linearly through a bore to pump fluid into a master cylinder (MC) fluid passageway 234. A fluid level sensor 225, such as a float switch, monitors a level of the hydraulic fluid in the fluid reservoir 224. A brake pedal 36 is coupled to press a brake linkage 38 which, in turn, actuates the master cylinder 230 to push fluid therethrough from the intake fluid passage 232 and to pressurize the MC fluid passageway 234. Travel sensors 37 and 37A monitor a position of the brake pedal 36.

A pedal feel emulator (PFE) 236 is fluidly coupled to the MC fluid passageway 234 to selectively provide a natural feeling of brake operation, particularly when the master cylinder 230 is decoupled from operating the wheel brakes 22a, 22b, 22c, 22d. The PFE 236 includes a PFE piston dividing the PFE 236 into an upper chamber and a lower chamber, and a spring biasing the PFE piston into the upper chamber. The upper chamber of the PFE 236 is fluidly coupled to the MC fluid passageway 234. A first pressure sensor 238 monitors the pressure in the MC fluid passageway 234. The first pressure sensor 238 may also monitor a temperature in the MC fluid passageway 234. The first pressure sensor 238 may also be called a PFE pressure/temperature sensor (PPFE).

A pressure supply unit (PSU) assembly 240 includes a PSU motor 242 and a PSU pump 244 to supply the hydraulic fluid from the fluid reservoir 224 to a PSU fluid passageway 250. The PSU assembly 240 may draw fluid from a return fluid passageway 252 that is connected to the fluid reservoir 224 and which is maintained at or near ambient atmospheric pressure. A second pressure sensor 251 monitors the pressure in the PSU fluid passageway 250. The second pressure sensor 251 may also measure a temperature in the PSU fluid passageway. The second pressure sensor 251 may also be called a PSU pressure sensor (PPSU). A rotor angle sensor (RAS) 243 may be coupled to the PSU motor 242 to determine a position of the rotor in the motor, and thus a position of the PSU pump 44. The PSU pump 244 includes a PSU piston 245 that separates a first fluid chamber 246 from a second fluid chamber 248.

The first fluid chamber 246 of the PSU 420 is directly connected to the PSU fluid passageway 250. In response to the PSU piston 245 moving away from the PSU motor 242, fluid is pressed out of the first fluid chamber 246 and into the PSU fluid passageway 250. The second fluid chamber 248 of the PSU assembly 240 is directly connected to a replenishing fluid passageway 254. A check valve 258 allows fluid flow from the replenishing fluid passageway 254 into the PSU fluid passageway 250 while blocking fluid flow in an opposite direction. The check valve 258 may also be called a PSU refill check valve (PRCV).

A PSU reservoir isolation valve (PRIV) 262, which may be a normally-closed solenoid valve, selectively controls fluid flow between the return fluid passageway 252 and a first intermediate fluid passageway 264.

A displacement fluid passageway 268 is connected to the lower chamber of the PFE 236 for transmitting fluid there-from in response to the PFE piston moving from application of the brake pedal 36. A PFE isolation valve (PFIV) 269, which may be a normally-open solenoid valve, selectively couples the intermediate fluid passageway 64 and the displacement fluid passageway 68.

A backup pump assembly (BPA) 270 includes a backup pump motor 272 operably coupled to two backup pump elements 274, each configured to convey brake fluid from the fluid reservoir 224 via the intake fluid passage 232 and to the PSU fluid passageway 250.

A master cylinder isolation valve (MCIV) 280 which may be a normally-open solenoid valve, selectively controls fluid flow between the MC fluid passageway 234 and a second intermediate fluid passageway 281. The MCIV 280 may thereby selectively block fluid communication between an outlet of the master cylinder 230 and the wheel brakes 22a, 22b, 22c, 22d. A second pressure/temperature sensor 282, which may be called a pressure master cylinder (PMC) sensor, monitors pressure and/or pressure in the second intermediate fluid passageway 281. A secondary source valve (SSV) 284, which may be a normally-open solenoid valve, selectively controls fluid flow between the second intermediate fluid passageway 281 and the PSU fluid passageway 250. The SSV 284 may thereby control a flow of brake fluid between an outlet of the master cylinder 230 and the wheel brakes 22a, 22b, 22c, 22d for defining proportional flow with the system operating in a fallback mode. A secondary source bypass valve (SSBV) 286, which may be a normally-closed solenoid valve, selectively controls fluid flow between the second intermediate fluid passageway 281 and an intake to the BPA 270.

A fourth check valve 288 is connected between the intake fluid passage 232 and the intake to the BPA 270 and is configured to allow fluid flow from the intake fluid passage 232 to flow into the intake to the BPA 270 while blocking fluid flow in an opposite direction. The fourth check valve 288 may also be called a backup reservoir check valve (BRCV).

The PSU fluid passageway 250 splits fluid supply into a first brake circuit 290 and a second brake circuit 292. In some embodiments, and as shown in FIG. 4, the first brake circuit 290 is connected to the front wheel brakes 22a, 22b, and the second brake circuit 292 is connected to the rear wheel brakes 22c, 22d. However, other configurations may be used.

A control valve manifold 300 fluidly connects the two brake circuits 290, 292 to the corresponding wheel brakes 22a, 22b, 22c, 22d. The control valve manifold 300 includes an apply valve 302a, 302b, 302c, 302d and a release valve 304a, 304b, 304c, 304d corresponding to each of the wheel brakes 22a, 22b, 22c, 22d to selectively control fluid flow between the corresponding one of the of the wheel brakes 22a, 22b, 22c, 22d and an associated one of the two brake circuits 290, 292. The apply valves 302a, 302b, 302c, 302d and the release valves 304a, 304b, 304c, 304d may collectively be called antilock brake system (ABS) valves for their use in such an ABS. However, the apply valves 302a, 302b, 302c, 302d and the release valves 304a, 304b, 304c, 304d may be used for other functions, such as for traction control and/or for torque vectoring.

A first isolation valve 306, which may be a normally-open solenoid valve, is configured to selectively control fluid flow in the first brake circuit 290 between the PSU fluid passageway 250 and the control valve manifold 300. The first isolation valve 306 may also be called a front isolation valve (Hy). A second isolation valve 308, which may be a normally-open solenoid valve, is configured to selectively control fluid flow in the second brake circuit 292 between the PSU fluid passageway 250 and the control valve manifold 300. The second isolation valve 306 may also be called a rear isolation valve (RIV). Either or both of the first isolation valve 306 and/or the second isolation valve 308 may function to prevent an outflow of the pressure medium (i.e. brake fluid) from the wheel brakes 22a, 22b, 22c, 22d to the fluid reservoir 224 in an inactive state. The first isolation valve 306 and/or the second isolation valve 308 may control an outflow in an activated state, with the apply valves 302a, 302b, 302c, 302d being closed, so that a reduction in wheel brake pressure takes place.

In some embodiments, and as shown in FIG. 4, a bi-directional check valve 310, 311 is disposed in each of the two brake circuits 290, 292 between the PSU fluid passageway 250 and the control valve manifold 300. Each of the bi-directional check valves 310, 311 may allow fluid flow in either direction, but only when a differential pressure thereacross is above some threshold value. The bi-directional check valves 310, 311 may limit an amount of fluid lost in case of a leak in the system, such as a leak in a brake line supplying any of the wheel brakes 22a, 22b, 22c, 22d.

FIG. 4 also shows the one-box BbW system 220 that includes a brake system electronic control unit (ECU) 340, with electrical connections for monitoring the various sensors 37, 37A, 225, 238, 243, 251, 282, and for controlling the various actuators, such as the PSU motor 242, the backup pump motor 272, the EPB actuators 346, and the various solenoid valves 262, 269, 280, 284, 286, 302a, 302b, 302c, 302d, 304a, 304b, 304c, 304d, 306, 308. The ECU 340 is also connected to one or more external controllers 342 of a vehicle via a communications network, such as Controller Area Network (CAN bus). These external controllers 342 may control such things as Auto-Pilot, steering sensor, and warning lamps. The ECU 340 includes a first printed circuit board (PCB) 210 and a second PCB 212, which are configured to provide independent control circuits. The first PCB 210 includes a first control circuit that supplies power and/or a control signal to the PSU motor 242 for controlling operation thereof. The second PCB 212 includes a second control circuit that supplies power and/or a control signal to the backup pump motor 272 for controlling operation thereof. In some embodiments, the first PCB 210 provides a normal automated braking and the second PCB 212 provides a redundant automated braking for execution in fallback mode due to a fault in the first PCB 210 or a fault with any of its associated devices, such as a fault or error with the PSU assembly 240. In some embodiments, an electrically-isolated communication network, such as a controller area network (CAN) may provide communication between the first PCB 210 and the second PCB 212.

In some embodiments, and as shown in FIG. 4, the ECU 340 may be connected to an electric parking brake (EPB) switch 344 for activating an EPB actuator 346 on one or more of the wheel brakes 22a, 22b, 22c, 22d, such as the right-rear wheel brake 22c and the left-rear wheel brake 22d. However, other ones of the wheel brakes the wheel brakes 22a, 22b, 22c, 22d may include the EPB actuators 346.

Figure 4A:
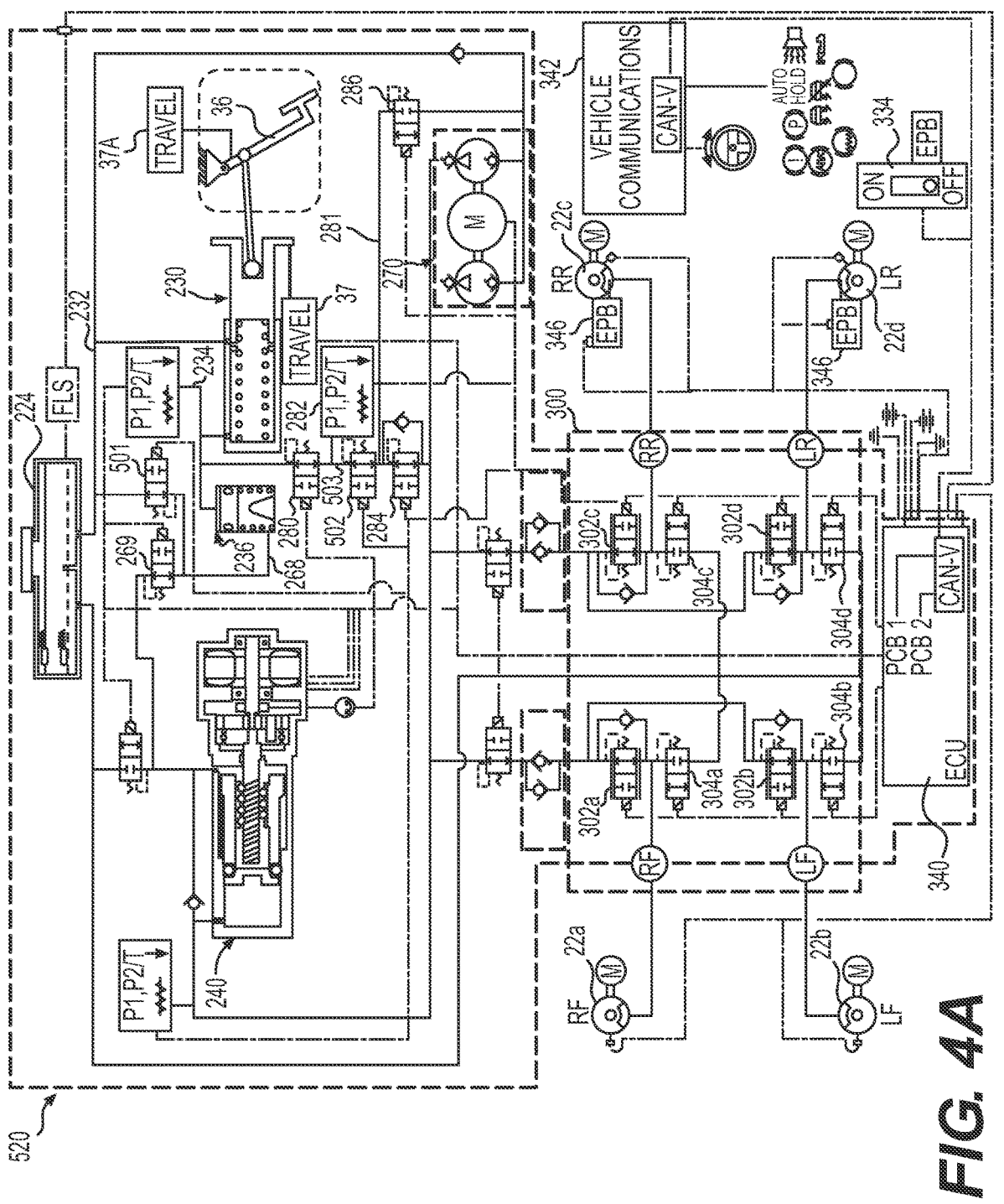
FIG. 4A shows a schematic diagram of an alternate one-box BbW system of the present disclosure.

FIG. 4A shows an alternate one-box BbW system 520 that is nearly identical to the one-box BbW system 220 shown in FIG. 4. The alternate one-box BbW system 520 provides an enhanced fallback mode that goes beyond meeting the SAE Level 3 requirements. The BbW system in FIG. 4A is identical to that shown in FIG. 4 except for three changes: 1) the pump backup reservoir check valve BRCV 288 is deleted, 2) a pedal feel fallback valve (PFFV) 501 is added, and 3) a master cylinder fallback valve (MCFV) 502 is added. The PFFV 501 selectively controls fluid flow between the intake fluid passage 232 and the displacement fluid passageway 268. The PFFV 501 may be a normally-open solenoid valve, although other types of valves may be used. The MCFV 502 selectively controls fluid flow between a third intermediate fluid passageway 503 and the second intermediate fluid passageway 281. The MCFV 502 may be a normally-open solenoid valve, although other types of valves may be used. The MCIV 280 is fluidly connected to the third intermediate fluid passageway 503 and selectively controls fluid flow between the MC fluid passageway 234 and third intermediate fluid passageway 503. Thus, the MCFV 502 has a series fluid arrangement with the MCIV 280, with either of the MCFV 502 or the MCIV 280 being capable of selectively blocking fluid communication between an outlet of the master cylinder 230 and the wheel brakes 22a, 22b, 22c, 22d. The MCFV 502 and the MCIV 280 may each be controlled by different control circuits. For example, the MCIV 280 may be controlled by a control circuit of the first PCB 210, and the MCFV 502 may be controlled by a control circuit of the second PCB 212. Additionally, the second pressure/temperature sensor 282 may monitor pressure and/or pressure in the third intermediate fluid passageway 503.

Both of the PFFV 501 and the MCFV 502 are powered by the second PCB 212, which is configured to provide full braking function in case the PSU assembly 240 and/or the first circuit board 210 are faulted or otherwise unavailable. Should the fallback mode be needed, just like the one-box BbW system 220 in FIG. 4, the backup pump motor 272 of the BPA 270 will run when increased pressure is required. All valves are in their normal state except for the SSV 284, the SSBV 286, the PFFV 501 and the MCFV 502. The SSBV 286 is energized to open the pump bypass recirculation loop. The SSV 284 is a linear, normally open valve that can control the amount of fluid flowing through it based upon the amount of current applied. If no current is applied, the SSV 284 is fully open and very little back-pressure is created, and the flow is simply recirculated through SSBV. If full current is applied, the SSV 284 is fully closed, and all the flow goes to the wheel brakes 22a, 22b, 22c, 22d. Thus, by controlling the current to SSV 284 in proportion to the master cylinder travel, a proportional brake pressure is created that significantly reduces driver effort to slow the vehicle. Once desired pressure is achieved, the SSV 284 may be fully applied to close the valve and the backup pump motor may be shut off to save current draw. The PFFV 501 and the MCFV 502 are both energized. This keeps the master cylinder 230 isolated from the wheel brakes and permits the pedal feel emulator 236 to function. Thus, the pedal feel to the driver remains very similar to that in normal BbW mode which will be more comfortable to the driver.

Figure 5:
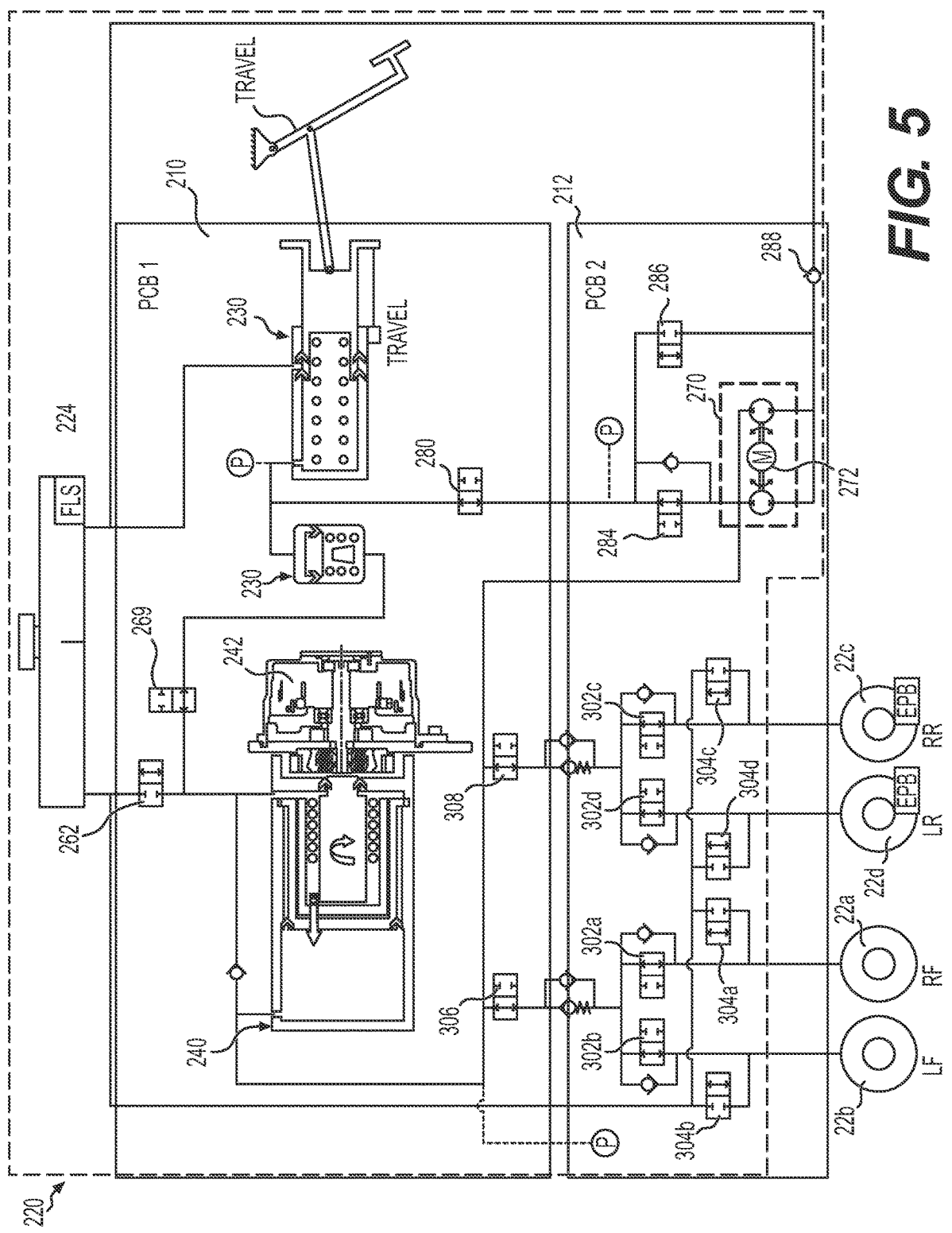
FIG. 5 shows a schematic diagram of the one-box BbW system of FIG. 4.

FIG. 5 shows a schematic diagram of the one-box BbW system 220 of the present disclosure. FIG. 5 shows how various electrical components of the one-box BbW system 220 are controlled by one of two independent control networks, in the form of a first printed circuit board (PCB) 210 and a second PCB 212, each having separate electrical power supplies and separate electrical ground connections.

The one-box BbW system 220 of the present disclosure is capable of meeting Level 3+ safety requirements. The one-box BbW system 220 includes the following features: The first PCB 210 may operate the one-box BbW system 220 in a normal operating mode, and the second PCB 212 may operate the one-box BbW system 220 in a fallback mode. The fallback mode may be used for operating the wheel brakes 22a, 22b, 22c, 22d in case the normal operating mode is not available. For example, in case of a mechanical or electrical component failure with the first PCB 210 or one or more devices connected thereto. The second PCB 212 may be configured to control the backup pump and motor assembly with control valves to supply pressure for operating the wheel brakes 22a, 22b, 22c, 22d in case the PSU assembly 240 is unable to supply pressure for operating the wheel brakes 22a, 22b, 22c, 22d.

Figure 6:
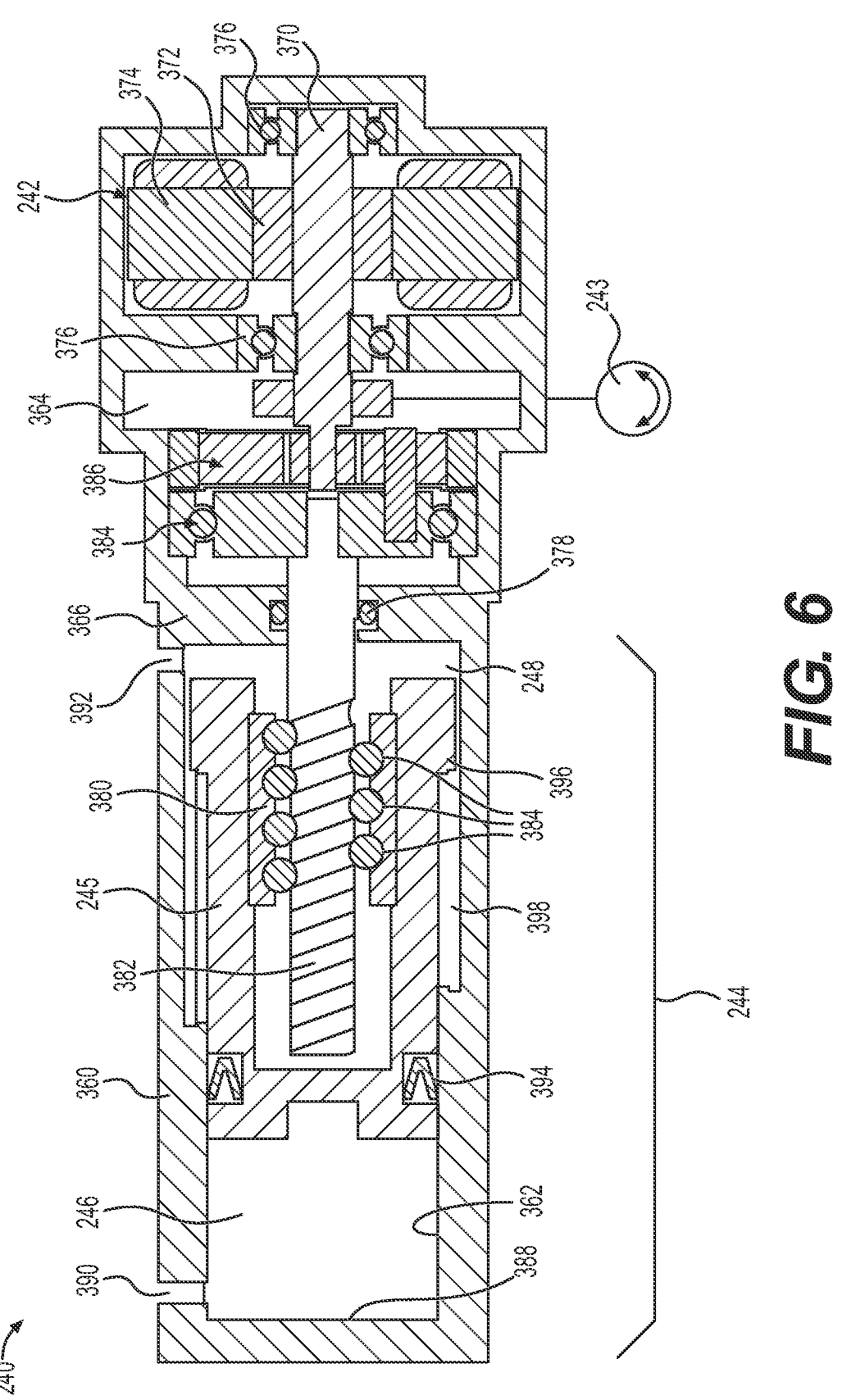
FIG. 6 shows a cut-away diagram of a pressure supply unit (PSU), in accordance with an aspect of the present disclosure.

FIG. 6 shows a cut-away diagram of the PSU assembly 240 of the one-box BbW system 220. The PSU assembly 240 includes the PSU motor 242 configured to operate the PSU pump 244 to discharge brake fluid to the PSU fluid passageway 250.

The PSU assembly 240 includes a PSU housing 360 defining a piston bore 362. The PSU housing 360 also defines a rear chamber 364, which contains the PSU motor 242. A partition 366 separates the piston bore 362 from the rear chamber 364. The partition 366 allows the rear chamber 364 to be maintained dry, while the piston bore 362 contains brake fluid. The PSU motor 242 includes a motor shaft 370 coupled to a grouping of arcuate-shaped permanent magnets 372, which is acted upon by electrical current in a stator 374. Shaft bearings 376 may support the motor shaft 370 on either side of the magnets 372.

The PSU pump 244 includes the PSU piston 245 that is acted upon by an actuator nut 380. The outside surface of the actuator nut 380 is permanently attached to the PSU piston 245. The PSU piston 245 is restrained from rotation but free to translate by anti-rotation features 396 such as a series of protrusions or bosses on its outside diameter that fit into corresponding anti-rotation features 398 such as a series of slots, keyways, or troughs located in the PSU housing 360. The PSU motor 242 rotates a spindle 382, which is threaded and configured to move the actuator nut 380 in a linear path, thereby causing the PSU piston 245 to translate through the piston bore 362 in either of two directions, toward or away from the PSU motor 242.

In some embodiments, one or more ball bearings 384 may be disposed between the spindle 382 and the actuator nut 380, providing a ball-screw interface. A gear set 386, which may include one or more planetary reduction gears, mechanically couples the motor shaft 370 of the PSU motor 242 and the spindle 382, reducing the speed and increasing torque applied to the spindle 382. A high-pressure rotary seal 378 is disposed around the spindle 382 at the partition 366, providing a fluid-tight seal between the piston bore 362 and the rear chamber 364, while allowing the spindle 382 to rotate. The high-pressure rotary seal 378 may include a lip seal. However, other types of seals may be used.

The PSU piston 245 is disposed within the piston bore 362 and configured to move linearly therethrough in response to being pushed and/or pulled by the actuator nut 380. The piston bore 362 extends between the partition 366 and a terminal end 388. The piston bore 362 defines the first fluid chamber 246, which extends from the PSU piston 245 to the terminal end 388. The piston bore 362 also defines the second fluid chamber 248, which extends from the partition 366 to the PSU piston 245. A first PSU port 390 provides fluid communication between the first fluid chamber 246 and external fluid circuits. The first PSU port 390 may be fluidly coupled to the PSU fluid passageway 250 for supplying the fluid thereto. A second PSU port 392 provides fluid communication between the second fluid chamber 248 and external fluid circuits. The second PSU port 392 may be fluidly coupled to the replenishing fluid passageway 254 for conveying fluid between the second fluid chamber 248 and the replenishing fluid passageway 254.

In some embodiments, and as shown in FIG. 6, the PSU piston 245 includes a PSU piston seal 394, such as a lip seal, that prevents fluid from leaking by the PSU piston 245 between the first fluid chamber 246 and the second fluid chamber 248.

The high-pressure rotary seal 378 may serve multiple functions. First, the high-pressure rotary seal 378 may allow the PSU assembly 240 to regenerate at system pressures. Additionally, and in the event of a failure of the PSU piston seal 394, the high-pressure rotary seal 378 will prevent fluid from getting into the PSU motor 242 and thus maintain integrity of the hydraulic system. This may be especially important to provide backup for a single-circuit master cylinder.

The actuator nut 380, the spindle 382, and one or more ball bearings 384 may together be called a ball screw mechanism 380, 382, 384. A unique feature of the PSU assembly 240 of the present disclosure is how ball screw mechanism 380, 382, 384 is sealed on the spindle 382, thus eliminating the need for a separate push rod actuator. The result is that the ball screw mechanism 380, 382, 384 is nested inside the PSU piston 245 and is flooded with brake fluid for lubrication. The other benefit of this design is that a simple, straight bore can be used for the PSU piston 245 since the fluid displacement on either side of the PSU piston seal 394 is exactly the same. Finally, the high-pressure rotary seal 378 provides a secondary leak barrier to maintain system integrity in the event of a failure of the PSU piston seal 394.

Referring to FIG. 4, the one-box BbW system 220 of the present disclosure may be called a 15-valve design, because of its inclusion of fifteen actuated valves 262, 269, 280, 284, 286, 302a, 302b, 302c, 302d, 304a, 304b, 304c, 304d, 306, 308. However, aspects of the one-box BbW system 220 of the present disclosure may be implemented in systems having a different number of actuated valves.

When in normal brake-by-wire mode and the driver applies the brake pedal, the MCIV 280 is closed, and the PRIV 262 is opened. Master cylinder fluid is directed to the PFE 236 to simulate normal brake pedal force and travel. That same travel information is sent to the ECU 340 which subsequently applies the appropriate current to the PSU motor 242 to rotate the ballscrew and mechanically displace the PSU piston 245. This causes the fluid to travel through the dual check valves 310, through the ABS apply valves 302a, 302b, 302c, 302d and finally reaching the wheel brakes 22a, 22b, 22c, 22d to apply pressure and slow the vehicle.

Since this is an "open" system, meaning the fluid released from the wheel brakes 22a, 22b, 22c, 22d in an ABS stop is not captured but flows back to the fluid reservoir 224 at atmospheric pressure, it is necessary to replenish the PSU assembly 240. This is accomplished by first closing the PRIV 262 and the PFIV 269 which traps the pressure behind the PSU piston 245. The Front Isolation Valve (FIV) 306 and the Rear Isolation Valve (RIV) 308 are also closed to lock in system pressure at the wheel brakes 22a, 22b, 22c, 22d. The ball screw and the PSU piston 245 are retracted. This forces fluid behind the PSU piston 245 to flow to the front of the PSU piston 245 via the second check valve 258. Pressure on both sides of the PSU piston 245 is maintained during replenishment since both sides of the PSU piston 245 displace equal volumes as the PSU piston 245 travels. When the PSU piston 245 starts forward again, the PRIV 262, PFIV 269, FIV 306, and RIV 308 are all returned to their previous states.

To meet requirements for driving automation Level 3, the automated driving system must monitor itself and have a redundant path to continue driving the vehicle. Likewise, the brake system must include redundancy to execute a command from the automated driving system, such as an Advanced Driver Assistance System (ADAS), to be able to slow down and halt the vehicle after any first failure of the brake system. Accordingly, the one-box BbW system 220 of the present disclosure may include a redundant power source to the wheel brakes and a redundant control network with separate power supply to be able to stop the vehicle under all conditions.

If the PSU assembly 240 fails, the BPA 270 may be turned on immediately whenever the driver applies the brakes. Simultaneously, the PRIV 262 will be de-energized and held closed and the MCIV 280 will be de-energized and held open. The SSBV 286 will be energized to permit pump recirculation and the SSV 284, which may be a linear valve, will be driven and actuated in proportion to the brake pedal travel with feedback from the second pressure sensor 251 to assure driver intent of deceleration vs pedal force is being met. In some embodiments, the SSV 284 may be a current-controlled valve, controlled by an amount of electrical current supplied thereto.

If an autopilot mode, such as ADAS control, is required and there is no driver assist, the only difference is that the SSBV 286 is closed, and the pump recirculation fluid now returns through bypass holes in the master cylinder 230 as the driver is not applying the brake pedal. System pressure is determined by the current applied to the SSV 284.

Figure 7:
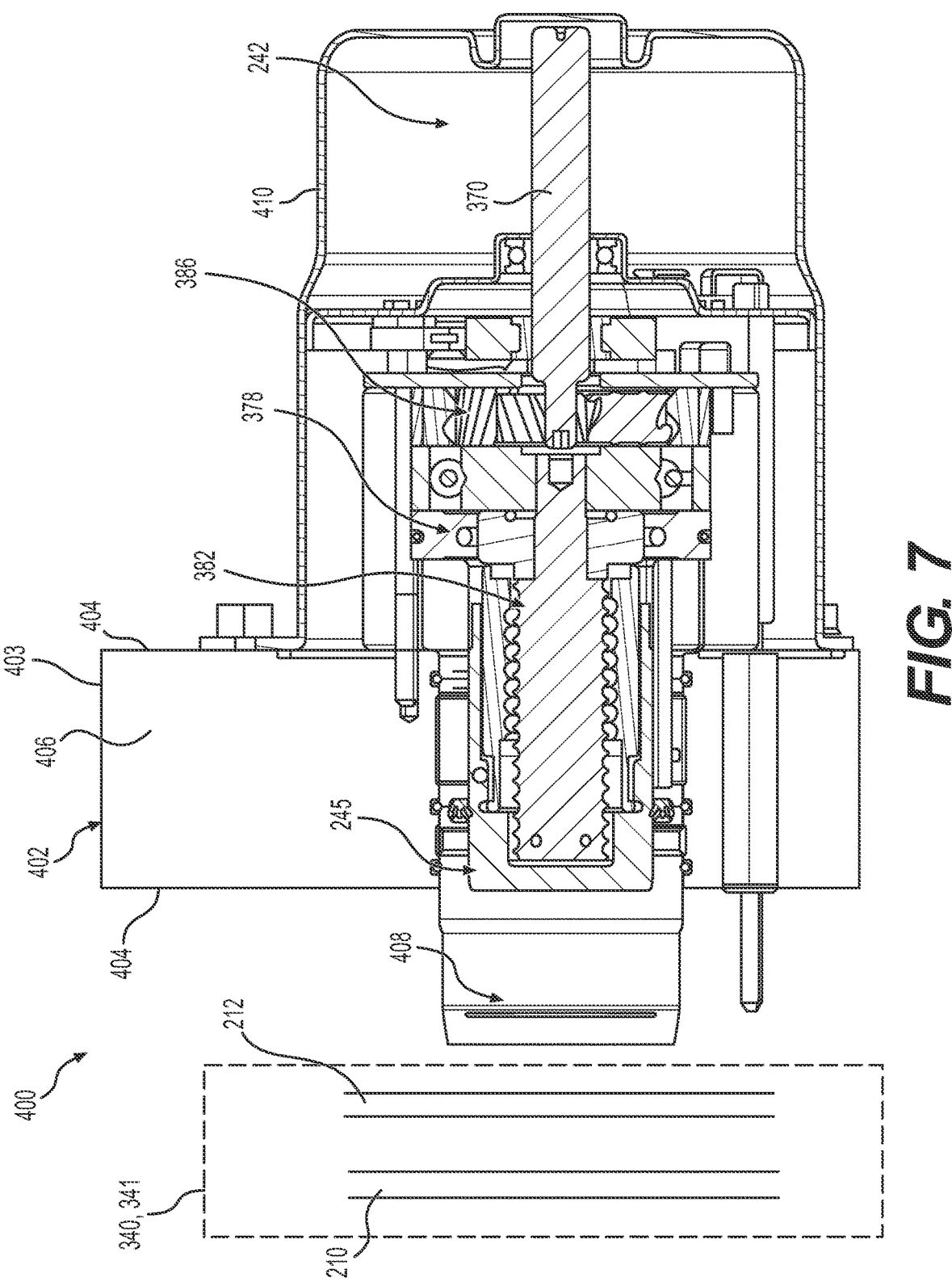
FIG. 7 shows a detailed portion of a cross-section of a one-box BbW module of the present disclosure.

FIG. 7 shows a detailed portion of a cross-section of a one-box BbW module 400 that includes the one-box BbW system 220 of the present disclosure. The one-box BbW module 400 includes a hydraulic control unit (HCU) block 402, which may be a block of metal, such as aluminum. The HCU block 402 may be machined or otherwise formed to define the various fluid passages and other structural and functional components. As shown in FIG. 7, the HCU block 402 includes a plurality of faces arranged at right-angles, including a top face 403, one or more side faces 404 that extend parallel and spaced apart from one another, and two end faces 406 that extend parallel and spaced apart from one another and perpendicular to the side faces 404. When installed in a vehicle, each of the side faces 404 and the end faces 406 may be vertical. The fluid reservoir 224 may be located on the top face 403 of the HCU block 402.

The one-box BbW module 400 also includes a PSU sleeve 408 located on one of the side faces 404 and containing one or more components of the PSU assembly 240. The one-box BbW module 400 also includes an HCU motor housing 410 which contains the PSU motor 242 and/or other components of the PSU assembly 240, such as the gear set 386. Together, the HCU block 402, the PSU sleeve 408, and/or the HCU motor housing 410 may form the PSU housing 360. FIG. 7 also shows the placement of the ECU 340 in an ECU housing 341 relative to the HCU block 402. In some embodiments, the ECU housing 341 may be abutted directly against the HCU block 402.

The one-box BbW module 400 incorporates a transverse-motor configuration. In the transverse-motor configuration, the HCU block 402 includes the master cylinder 40, 230 and the PSU assembly 240, with the PSU motor 242 mounted transverse to the master cylinder 40, 230. In some embodiments, and as shown in FIG. 7, the PSU motor 242 is mounted on the side face 404 of the HCU block 402, and the master cylinder 40, 230 is defined in the end face and extends into the HCU block 402 transverse thereto. In other words, the PSU motor 242 is mounted with its motor shaft 370 extending horizontally and perpendicular to the master cylinder 40, 230. For example, the HCU block 402 may define a master cylinder bore (not shown in the figures) configured to receive a master cylinder piston of the master cylinder 40, 230, and which is perpendicular to the motor shaft 370 of the PSU motor 242.

This arrangement may be possible due to the compact nature of the PSU assembly 240 of the present disclosure. The PSU motor 242 may include a standard brushless motor, and the gear set 386 may include a planetary gear set. Such a configuration may minimize overall cost, maximize motor efficiency, and minimize motor current draw saving money in the electronics.

Figures 8, 9:
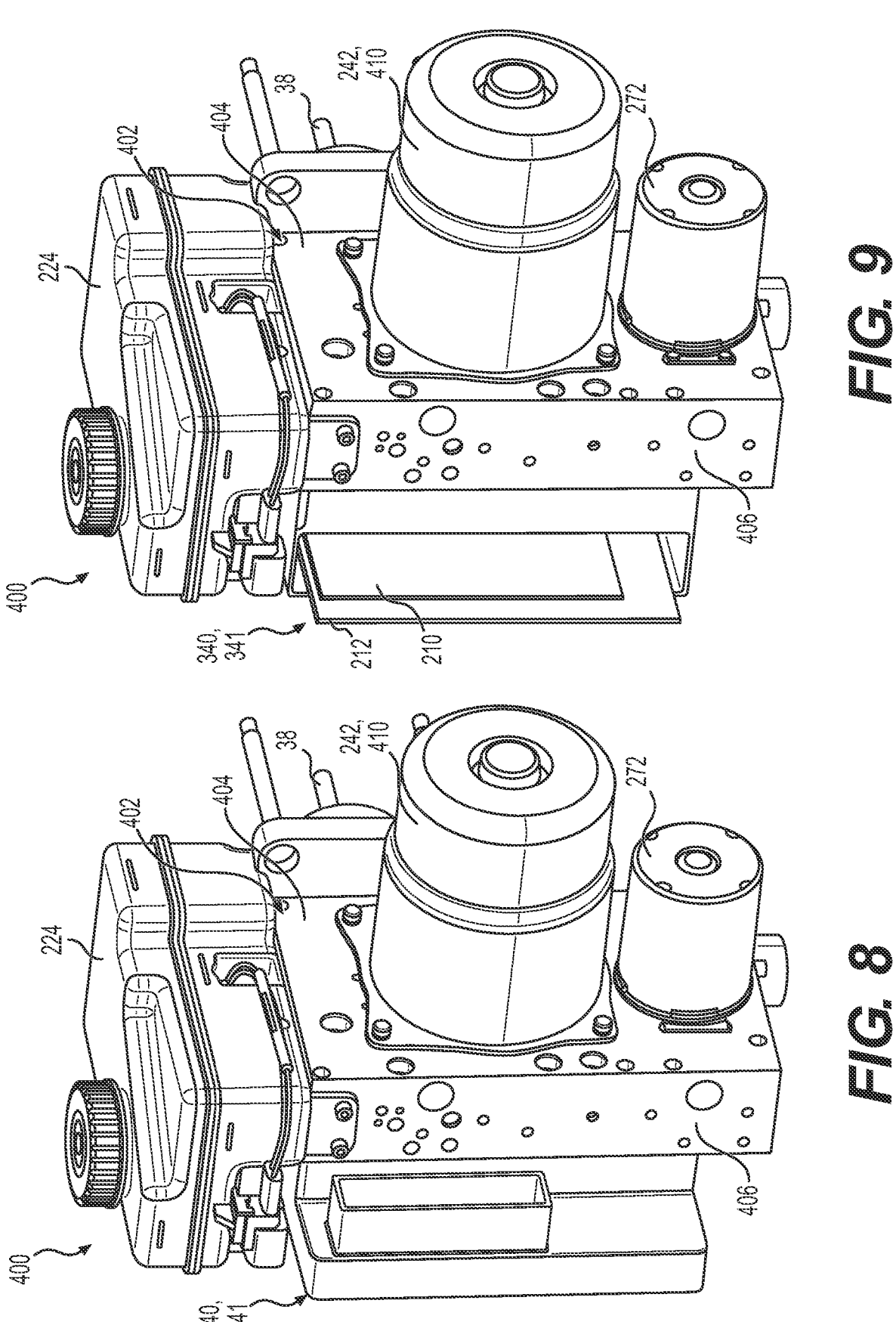
FIG. 8 shows a perspective view of the one-box BbW module of the present disclosure.
FIG. 9 shows a perspective view of the one-box BbW module, with a partial cut-away to show internal details of the ECU.

FIG. 8 shows a perspective view of the one-box BbW module 400, including the PSU motor 242 and the backup pump motor 272 each being located on the same side face 404 of the HCU block 402 and adjacent to one-another. The HCU block 402 may define a backup pump bore (not shown, but located adjacent to the backup pump motor 272) with one or more of the backup pump elements 274 disposed therein.

FIG. 9 shows a perspective view of the one-box BbW module 400, with a partial cut-away to show internal details of the ECU 340. FIG. 8 shows the ECU housing 341 including the two PCBs 210, 212 each extending parallel to and spaced apart from one another. The two PCBs 210, 212 of the ECU 340 may also be parallel to a side face 404 of the HCU block 402.

FIGS. 8-9 shows a packaging design of placing the PSU motor 242 and the backup pump motor 272 on the same face opposite the ECU 340. This layout may minimize costs when compared with alternative arrangements by allowing both hydraulic power units to interface directly with the ECU 340, thereby reducing a number of interconnections.

The one-box BbW system 220 and the associated one-box BbW module 400 of the present disclosure are configured to meet backup redundancy requirements for automation level 3 and above. The one-box BbW system 220 and the associated one-box BbW module 400 of the present disclosure are configured to provide backup redundancy in case of the failure of the pressure supply unit assembly 240 and are packaged as a single assembly. The one-box BbW system 220 and the associated one-box BbW module 400 of the present disclosure includes: 1) an integrated backup pump assembly (i.e. the BPA 270), and 2) two independent printed circuit boards inside a single electronic control unit housing 341.

The first printed circuit board 210 may control normal brake-by-wire components including the PSU assembly 240. The second printed circuit board 212, which may be independent of the first printed circuit board, 210, will have the capabilities to be able to continue to drive the vehicle and be able to execute commands from an external source, such as an ADAS to slow down and halt the vehicle even in cases of a failure of the first printed circuit board 210.

This unique combination of designs, including the pressure balanced PSU piston 245 with rotary lip seal on the spindle and transverse motor layout with integrated planetary gear set make this a truly unique design.

According to an aspect of the present disclosure, a brake system for motor vehicles in a normal brake-by-wire operating mode can be activated to slow the vehicle either by a driver or by an auto-pilot device and the same brake system in a fallback mode with a failed pressure supply unit can be activated normally in a fully boosted mode by the driver.

SUMMARY OF THE DISCLOSURE

The present disclosure provides an electro-hydraulic brake system for actuating wheel brakes of a vehicle. The electro-hydraulic brake system comprises a master cylinder (MC) fluidly coupled to a first MC fluid passageway and configured to supply fluid into the first MC fluid passageway in response to pressing force on a brake pedal coupled thereto. A first MC fluid passageway is directly coupled to a pedal feel emulator (PFE) including a PFE piston movable through a PFE bore and separating an upper chamber from a lower chamber for providing pressure opposing a pressing force on the brake pedal. The electro-hydraulic brake system also comprises a pressure supply unit (PSU) assembly that includes a PSU motor coupled to a ball screw actuator, a PSU housing defining a piston bore having a terminal end opposite the PSU motor, and a PSU piston disposed within the piston bore and movable by the ball screw actuator through the piston bore and dividing the piston bore into a first chamber and a second chamber, with each of the first chamber and the second chamber containing a hydraulic fluid. The electro-hydraulic brake system also comprises a backup pump assembly including a backup pump motor operably coupled to a pump to convey brake fluid for supplying the brake fluid to at least one of the wheel brakes. The ball screw actuator includes an actuator nut assembly having a plurality of ball bearings each disposed within the piston bore and submerged in the hydraulic fluid.

In some embodiments, the master cylinder is single-circuit master cylinder having a single piston and defining a single pressure chamber which is connected to the wheel brakes.

In some embodiments, the electro-hydraulic brake system further includes an electronic control unit (ECU) including a first control circuit configured to supply power to the PSU motor, and a second control circuit independent of the first control circuit and configured to supply power to the backup pump motor.

In some embodiments, the ECU further includes a first printed circuit board (PCB) defining the first control circuit; the ECU further includes a second PCB isolated from the first PCB and defining the second control circuit; and an electrically-isolated communication network provides communication between the first PCB and the second PCB.

In some embodiments, the electro-hydraulic brake system further includes a travel sensor configured to monitor a position of the brake pedal.

In some embodiments, the electro-hydraulic brake system further includes an intake fluid passage configured to transmit brake fluid between a fluid reservoir and the master cylinder; a displacement fluid passageway connected to the lower chamber of the PFE; and a pedal feel fallback valve (PFFV) configured to selectively block fluid communication between the intake fluid passage and the displacement fluid passageway.

In some embodiments, the PFFV is a normally-open solenoid valve.

In some embodiments, the electro-hydraulic brake system further includes a master cylinder isolation valve (MCIV) configured to selectively block fluid communication between an outlet of the master cylinder and the wheel brakes.

In some embodiments, the MCIV is a normally-open solenoid valve.

In some embodiments, the electro-hydraulic brake system further includes an electronic control unit (ECU) including a first control circuit configured to supply power to the PSU motor, and a second control circuit independent of the first control circuit and configured to supply power to the backup pump motor; and a master cylinder fallback valve (MCFV) in a series fluid connection with the MCIV and configured to selectively block fluid communication between an outlet of the master cylinder and the wheel brakes. In some embodiments, the MCIV and the MCFV are each controlled by different ones of the first control circuit and the second control circuit.

In some embodiments, the MCFV is a normally-open solenoid valve.

In some embodiments, the electro-hydraulic brake system further includes a secondary source valve (SSV) configured to control a flow of brake fluid between an outlet of the master cylinder and the wheel brakes.

In some embodiments, the SSV is a normally-open linear valve capable of variable control of flow therethrough.

In some embodiments, the electro-hydraulic brake system further includes a PSU fluid passageway configured to transmit fluid from the PSU assembly to the wheel brakes; a control valve manifold including at least one of an apply valve and a release valve for controlling fluid flow between the PSU fluid passageway and at least one of the wheel brakes; and an isolation valve configured to selectively control fluid flow between the PSU fluid passageway and the control valve manifold.

In some embodiments, the electro-hydraulic brake system further includes a PSU fluid passageway configured to transmit fluid from the PSU assembly to at least one wheel brake; a control valve manifold including at least one of an apply valve and a release valve for controlling fluid flow between the PSU fluid passageway and the at least one wheel brake; and a bi-directional check valve disposed between PSU fluid passageway and the control valve manifold and configured to allow fluid flow in either of two opposite directions therebetween only when a differential pressure thereacross is above a predetermined amount.

In some embodiments, the electro-hydraulic brake system further includes a PSU fluid passageway configured to transmit fluid from the PSU assembly to at least one wheel brake; a control valve manifold including at least one of an apply valve and a release valve for controlling fluid flow between the PSU fluid passageway and the at least one wheel brake; and an isolation valve disposed between PSU fluid passageway and the control valve manifold and configured to selectively control fluid flow therebetween.

The present disclosure also provides an electro-hydraulic brake assembly. The electro-hydraulic brake system comprises a hydraulic control unit (HCU) body defining a pressure supply bore, a master cylinder bore, and a backup pump bore; and a primary piston slidably disposed in the master cylinder bore and configured to supply brake fluid to a wheel brake in response to pressing of a brake pedal. The electro-hydraulic brake system also comprises a pressure supply unit including a pressure supply piston disposed within the pressure supply bore, and a PSU motor having a motor shaft configured to cause the pressure supply piston to translate linearly through the pressure supply bore. The electro-hydraulic brake system also comprises a backup pump assembly including a backup pump motor and backup pump element disposed in the backup pump bore, the backup pump motor being operably coupled to the backup pump element to convey brake fluid for supplying the brake fluid to the wheel brake.

In some embodiments, the HCU body includes a top face, two side faces extending parallel to and spaced apart from one another, and an end face extending perpendicular to the top face and each of the two side faces. In some embodiments, the master cylinder bore is defined in the end face. In some embodiments, the PSU motor and the backup pump motor are each located on a same side face of the two side faces of the HCU body.

In some embodiments, the electro-hydraulic brake system further includes a fluid reservoir disposed on the top face of the HCU body.

In some embodiments, the electro-hydraulic brake system further includes an electronic control unit (ECU) coupled to a side face of the HCU body opposite from the PSU motor and the backup pump motor.

In some embodiments, the brake system includes an inlet valve and outlet valve for each of the wheel brakes for setting wheel-individual brake pressures which are derived from signals generated by the electronic control unit where the inlet valves transmit fluid to the wheel brakes in an unactivated state and limiting or preventing a build-up of wheel pressure in an activated state and the outlet valves. The inlet valves may include the apply valves 302a, 302b, 302c, 302d, and the outlet valves may include the release valves 304a, 304b, 304c, 304d.

In some embodiments, the brake system includes a single HCU block 402 that contains at least a part of each of the pressure supply unit assembly 240 and the backup pump assembly 270, with the two associated motor assemblies located on a single face of the HCU block 402 opposite the face that houses control valves and sensors, a reservoir located on a top face perpendicular to the face of the PSU and a master cylinder bore perpendicular to the PSU bore.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electro-hydraulic brake system for actuating wheel brakes of a vehicle, comprising:
    a master cylinder (MC) fluidly coupled to a first MC fluid passageway and configured to supply fluid into the first MC fluid passageway in response to pressing force on a brake pedal coupled thereto;
    the first MC fluid passageway directly coupled to a pedal feel emulator (PFE) including a PFE piston movable through a PFE bore and separating an upper chamber from a lower chamber for providing pressure opposing a pressing force on the brake pedal;
    a pressure supply unit (PSU) assembly including a PSU motor coupled to a ball screw actuator, a PSU housing defining a piston bore having a terminal end opposite the PSU motor, and a PSU piston disposed within the piston bore and movable by the ball screw actuator through the piston bore and dividing the piston bore into a first chamber and a second chamber, with each of the first chamber and the second chamber containing a hydraulic fluid;

a backup pump assembly including a backup pump motor operably coupled to a pump to convey brake fluid for supplying the brake fluid to at least one of the wheel brakes; and
    wherein the ball screw actuator includes an actuator nut assembly having a plurality of ball bearings each disposed within the piston bore and submerged in the hydraulic fluid,
    wherein the electro-hydraulic brake system further comprises:
    a PSU fluid passageway configured to transmit fluid from the PSU assembly to at least one wheel brake;
    a control valve manifold including at least one of an apply valve and a release valve for controlling fluid flow between the PSU fluid passageway and the at least one wheel brake; and
    a bi-directional check valve disposed between the PSU fluid passageway and the control valve manifold and configured to allow fluid flow in either of two opposite directions therebetween only when a differential pressure thereacross is above a predetermined amount.

2. The electro-hydraulic brake system of claim 1, wherein the master cylinder is single-circuit master cylinder having a single piston and defining a single pressure chamber which is connected to the wheel brakes.

3. The electro-hydraulic brake system of claim 1, further comprising an electronic control unit (ECU) including a first control circuit configured to supply power to the PSU motor, and a second control circuit independent of the first control circuit and configured to supply power to the backup pump motor.

4. The electro-hydraulic brake system of claim 3, wherein the ECU further includes a first printed circuit board (PCB) defining the first control circuit;
    wherein the ECU further includes a second PCB isolated from the first PCB and defining the second control circuit; and
    wherein an electrically-isolated communication network provides communication between the first PCB and the second PCB.

5. The electro-hydraulic brake system of claim 1, further comprising a travel sensor configured to monitor a position of the brake pedal.

6. The electro-hydraulic brake system of claim 5, further comprising:
    an intake fluid passage configured to transmit brake fluid between a fluid reservoir and the master cylinder;
    a displacement fluid passageway connected to the lower chamber of the PFE; and
    a pedal feel fallback valve (PFFV) configured to selectively block fluid communication between the intake fluid passage and the displacement fluid passageway.

7. The electro-hydraulic brake system of claim 6, wherein the PFFV is a normally-open solenoid valve.

8. The electro-hydraulic brake system of claim 1, further comprising a master cylinder isolation valve (MCIV) configured to selectively block fluid communication between an outlet of the master cylinder and the wheel brakes.

9. The electro-hydraulic brake system of claim 8, wherein the MCIV is a normally-open solenoid valve.

10. The electro-hydraulic brake system of claim 8, further comprising:
    an electronic control unit (ECU) including a first control circuit configured to supply power to the PSU motor, and a second control circuit independent of the first control circuit and configured to supply power to the backup pump motor;

a master cylinder fallback valve (MCFV) in a series fluid connection with the MCIV and configured to selectively block fluid communication between an outlet of the master cylinder and the wheel brakes; and wherein the MCIV and the MCFV are each controlled by different ones of the first control circuit and the second control circuit.

11. The electro-hydraulic brake system of claim 10, wherein the MCFV is a normally-open solenoid valve.

12. The electro-hydraulic brake system of claim 1, further comprising a secondary source valve (SSV) configured to control a flow of brake fluid between an outlet of the master cylinder and the wheel brakes.

13. The electro-hydraulic brake system of claim 12, wherein the SSV is a normally-open linear valve capable of variable control of flow therethrough.

14. The electro-hydraulic brake system of claim 1, further comprising:

an isolation valve configured to selectively control fluid flow between the PSU fluid passageway and the control valve manifold.

15. The electro-hydraulic brake system of claim 1, further comprising:

an isolation valve disposed between the PSU fluid passageway and the control valve manifold and configured to selectively control fluid flow therebetween.

16. An electro-hydraulic brake assembly comprising:

a hydraulic control unit (HCU) body defining a pressure supply bore, a master cylinder bore, and a backup pump bore;

a primary piston slidably disposed in the master cylinder bore and configured to supply brake fluid to a wheel brake in response to pressing of a brake pedal; and a pressure supply unit including a pressure supply piston disposed within the pressure supply bore, and a PSU motor having a motor shaft configured to cause the pressure supply piston to translate linearly through the pressure supply bore; and a backup pump assembly including a backup pump motor and backup pump element disposed in the backup pump bore, the backup pump motor being operably coupled to the backup pump element to convey brake fluid for supplying the brake fluid to the wheel brake, wherein the electro-hydraulic brake assembly further comprises:

a pressure supply unit fluid passageway configured to transmit fluid from the pressure supply unit to the wheel brake;

a control valve manifold including at least one of an apply valve and a release valve for controlling fluid flow between the pressure supply unit fluid passageway and the wheel brake; and a bi-directional check valve disposed between the pressure supply unit fluid passageway and the control valve manifold and configured to allow fluid flow in either of two opposite directions therebetween only when a differential pressure thereacross is above a predetermined amount.

17. The electro-hydraulic brake assembly of claim 16, wherein the HCU body includes a top face, two side faces extending parallel to and spaced apart from one another, and an end face extending perpendicular to the top face and each of the two side faces;

wherein the master cylinder bore is defined in the end face; and wherein the PSU motor and the backup pump motor are each located on a same side face of the two side faces of the HCU body.

18. The electro-hydraulic brake assembly of claim 17, further comprising a fluid reservoir disposed on the top face of the HCU body.

19. The electro-hydraulic brake assembly of claim 17, further comprising an electronic control unit (ECU) coupled to a side face of the HCU body opposite from the PSU motor and the backup pump motor.

* * * * *